United States Patent
Lapchuk et al.

(10) Patent No.: US 7,522,331 B2
(45) Date of Patent: Apr. 21, 2009

(54) SPATIAL OPTIC MODULATING SYSTEM WITH SPECKLE REDUCTION AND METHOD THEREOF

(75) Inventors: Anatoliy Lapchuk, Suwon-si (KR); Seung-Do An, Suwon-si (KR); Victor Yurlov, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/846,345

(22) Filed: Aug. 28, 2007

(65) Prior Publication Data
US 2008/0049297 A1 Feb. 28, 2008

(30) Foreign Application Priority Data
Aug. 28, 2006 (KR) .................... 10-2006-0081853

(51) Int. Cl.
*G02B 26/00* (2006.01)
*G02B 26/08* (2006.01)
(52) U.S. Cl. .............. 359/291; 359/292; 359/298
(58) Field of Classification Search ........... 359/230, 359/231, 279, 290–292, 295, 298, 323
See application file for complete search history.

(56) References Cited

U.S. PATENT DOCUMENTS
2005/0243403 A1* 11/2005 Yun .................... 359/291

FOREIGN PATENT DOCUMENTS
KR 2003-0046500 A 6/2003

* cited by examiner

*Primary Examiner*—William C Choi
(74) *Attorney, Agent, or Firm*—Christensen O'Connor Johnson Kindness PLLC

(57) ABSTRACT

A spatial optic modulating system with speckle reduction and a method thereof are disclosed. According to an embodiment of the present invention, a spatial optic modulating system includes a spatial optic modulator, which modulates and reflects an image transferred in accordance with an upward or downward movement of a ribbon that is operated according to a contraction or expansion of a piezoelectric element, an image lens unit, which transfers an image modulated from the spatial optic modulator as a diffraction image to a scanner, and a phase modulator, which modulates a phase of the diffraction image transferred from the image lens unit. With the present invention, an image, from which a speckle is removed, can be displayed by modulating a phase of an image projected by using a spatial optic modulator.

9 Claims, 11 Drawing Sheets

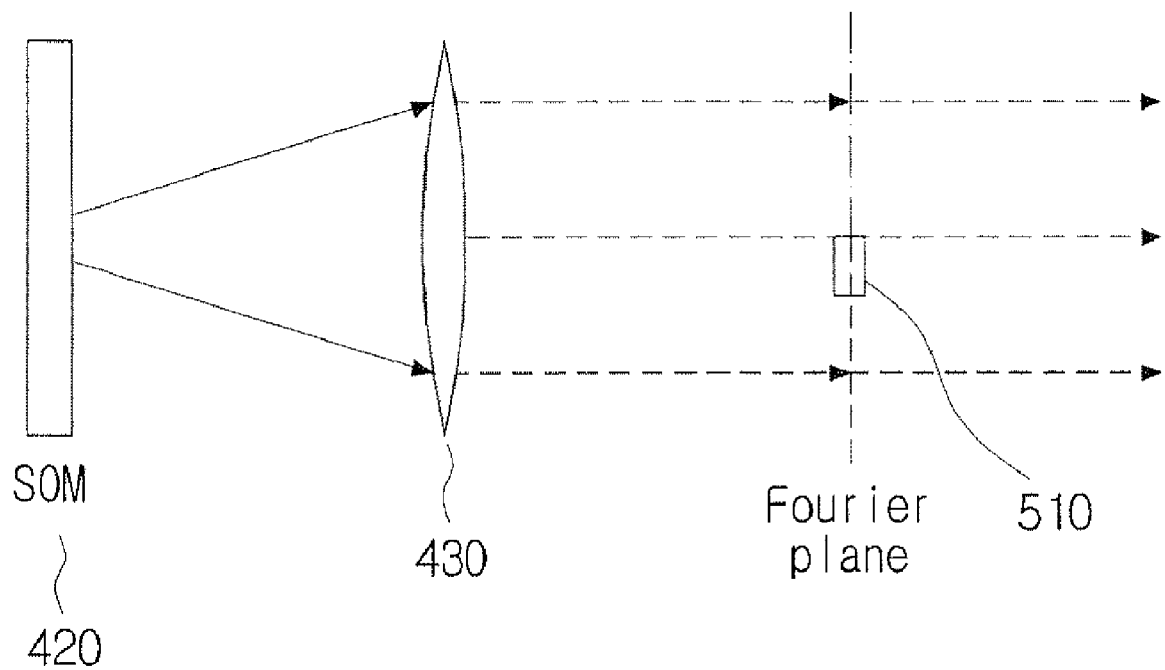

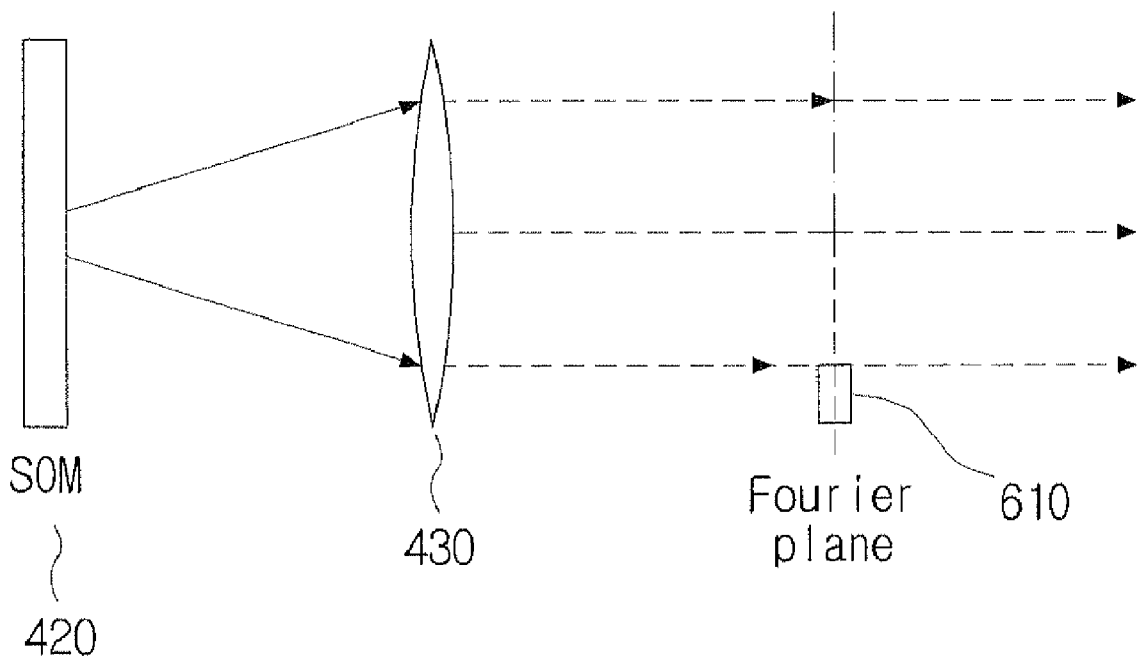

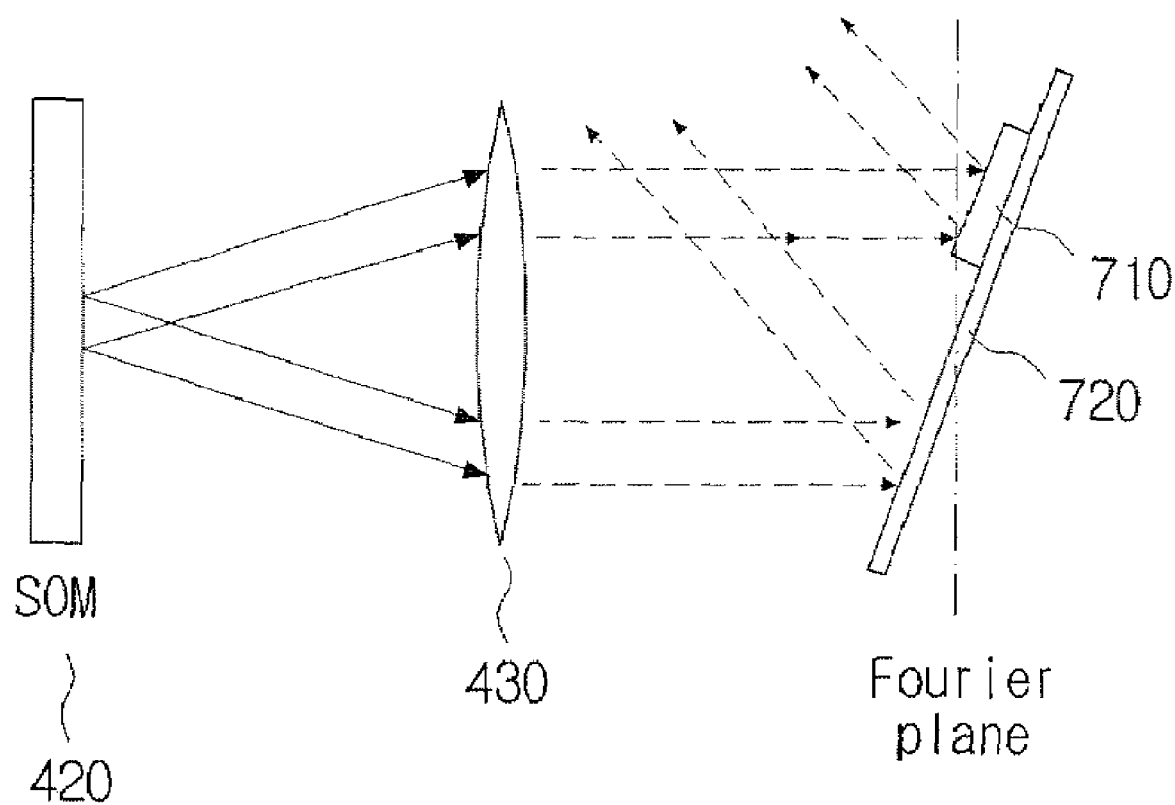

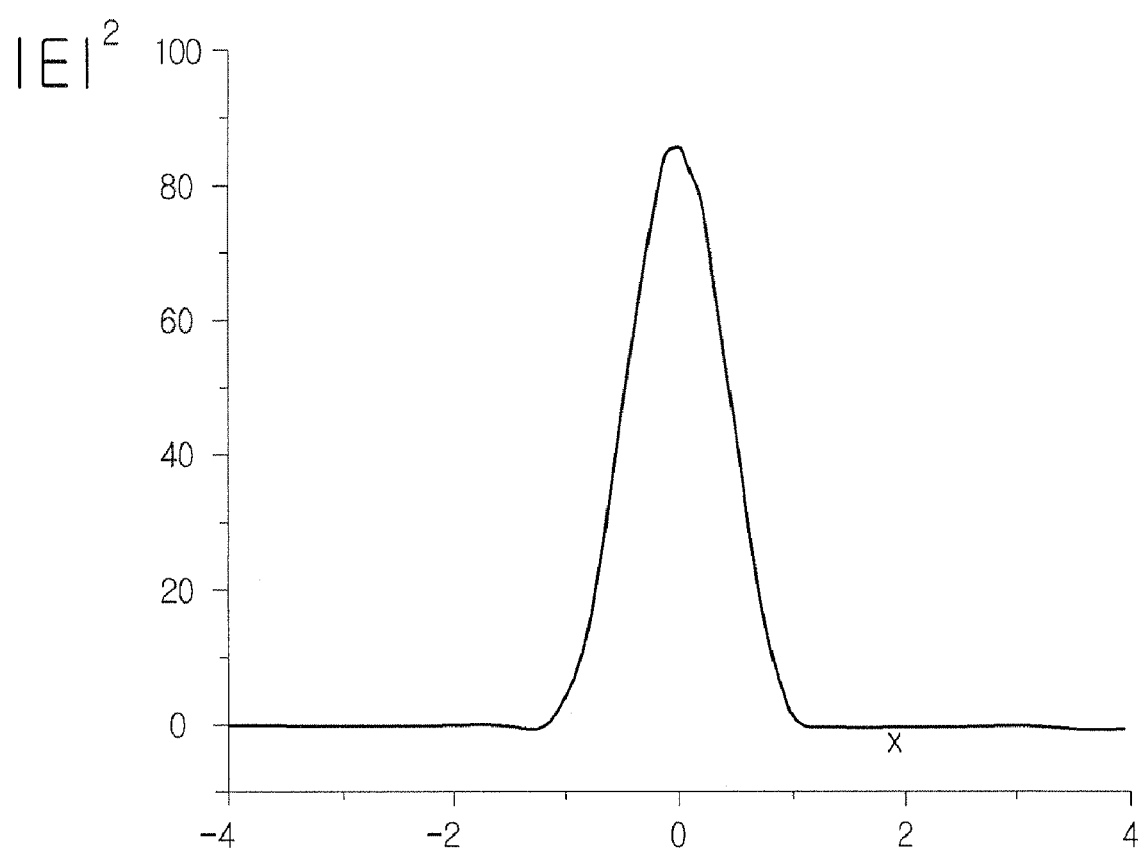

SPATIAL OPTIC MODULATING SYSTEM WITH SPECKLE REDUCTION AND METHOD THEREOF

BACKGROUND OF THE INVENTION

1. Field of the Invention

The present invention relates to a speckle reduction system, more specifically to a spatial optic modulating system with speckle reduction and a method thereof.

2. Background Art

The conventional optic system is configured to allow mirrors and lenses to be assembled on a large and heavy optical bench by using corresponding implements. In order to improve the efficiency of the optic system, it is required to precisely place an optic axis, a reflecting angle and a reflecting side by using a precise stage.

To solve the problem, there has been an attempt to make the optical system smaller, and such technology used for this attempt is referred to as a micro electro mechanical system (MEMS) or a micro electro mechanical device. Particularly, if the micromachining technology, which is one of the MEMS technologies, is used, not only optical devices having a smaller size than 1 mm but also micro optical systems can be realized.

The micro optical system is employed and applied in information communication apparatuses, information displays and recording apparatuses, due to its quick response, little loss, and integration and digital capabilities. For example, micro optical parts, such as micro-mirrors, micro-lenses and optical fiber holders, can be applied to a data storage device, a large display device, an optical communication device and adaptive optics.

Unlike the conventional large-sized projection systems, there has been a demand for compact-sized, inexpensive optical systems. As a result, devices that display a large-sized image by using a micro-mirror in order to improve the conventional projection system and to display a clearer image, have been manufactured and introduced in the market.

An optical modulator, in particular, including a micromirror refers to a circuit or an apparatus loading a signal in the light in a transmitter by using optical fibers or a free space of an optical frequency band as a transmission medium. The optical modulator is used for various fields such as optical memory, optical display, printer, optical interconnection and hologram. Currently, studies on display apparatuses using the optical modulator are actively in progress.

However, in the case of projecting an image to a screen by using the micro-mirror, a speckle, in which the brightness and the darkness are repeated, is generated due to the interference of the projected light. This speckle can cause an unclear image to form on the screen.

To reduce or remove the speckle, the conventional method generates N multiple speckles by regularly moving the screen, to which the image is projected, and offset the uncorrelation of the generated N multiple speckles with one another. Here, N is a natural number.

Beside that, the method of adding an optical device for reducing the speckle to the image system has been suggested. The speckle can be reduced or removed by allowing the optical device for deducing the speckle, which is located on a projecting path of the system, to change the phase of a modulated or projected image.

An apparatus for removing the speckle by mounting a wavefront modulator between a light modulator and a projection/scanning apparatus, which reflects an image to a screen, has also been suggested. However, there is the problem that these apparatuses are large and complex. This is because not only a first image system but also a second image system is required to project an image, which makes it impossible to be used in a compact-sized mobile communication terminal, such as a cellular phone, the portability of which is imperative.

SUMMARY OF THE INVENTION

As described above, the present invention provides a spatial optic modulating system with speckle reduction that reduces a speckle by phase-modulating an area of a reflected or projected image in the spatial optic modulating system.

The present invention also provides a spatial optic modulating system with speckle reduction that is smaller and less complex because it is not necessary to be equipped with the aforementioned second image system.

In addition, the present invention provides a spatial optic modulating system with speckle reduction that costs less to manufacture due to its simpler structure.

Other problems that the present invention solves will become more apparent through the following description.

To solve the above problems, according to an embodiment of the present invention, a spatial optic modulating system can include a spatial optic modulator, modulating and reflecting an image transferred in accordance with an upward or downward movement of a ribbon which is operated according to a contraction or expansion of a piezoelectric element; an image lens unit, transferring the image modulated from the spatial optic modulator as a diffraction image to a scanner; and a phase modulator, modulating a phase of the diffraction image transferred from the image lens unit.

Beside that, the system can further include an image processor, generating a light source controlling signal for controlling the operation of a light source in accordance with a predetermined image signal, an image control signal for controlling the operation of a micro-mirror that is included in the spatial optic modulator and modulates and reflects light, emitted from the light source, in accordance with a pixel, and a scanner controlling signal for controlling the operation of a scanner reflecting an image to a screen; a light lens unit, reflecting and concentrating the light emitted from the light source and transferring the reflected light; a driver IC, receiving the image controlling signal transferred from the image processor and generating an operating signal for operating the spatial optic modulator; and a scanner, reflecting the image transferred from the spatial optic modulator to the screen.

Here, the phase modulator can be located on a Fourier plane. In particular, the Fourier plane can be formed at a constant distance from the image lens unit, whereas the constant distance can be ½ of a radius of an image lens of the image lens unit.

The diffraction image can be a $0^{th}$ order diffraction image, and the phase modulator can phase-modulate light distributed on an area of a section of the $0^{th}$ order diffraction image passing through the Fourier plane.

Here, the area ranges between a ⅓ portion and a ⅔ portion of the section. Also the diffraction image can be a $+n^{th}$ or $-n^{th}$ order diffraction image, n being a natural number, and the phase modulator can modulate a phase of the $+n^{th}$ or $-n^{th}$ order diffraction image. Here, the n is 1. Beside that, the phase modulator can be coupled to the scanner.

BRIEF DESCRIPTION OF THE DRAWINGS

These and other features, aspects and advantages of the present invention will become better understood with regard to the following description, appended claims and accompanying drawings where:

FIG. 5 is a conceptual diagram of a spatial optic modulating system removing a speckle by phase-modulating a half of $0^{th}$ order diffraction image in accordance with an embodiment of the present invention;

FIG. 6 is a conceptual diagram of a spatial optic modulating system removing a speckle by phase-modulating a half of $+1^{st}$ and $-1^{st}$ order diffraction images in accordance with another embodiment of the present invention;

FIG. 7 is a conceptual diagram of a spatial optic modulating system removing a speckle by connecting a phase modulating unit to a scanner in accordance with another embodiment of the present invention;

FIG. 8D illustrates absolute square per time of the energy distribution graph of FIG. 8C.

DESCRIPTION OF THE EMBODIMENTS

Figure 1:
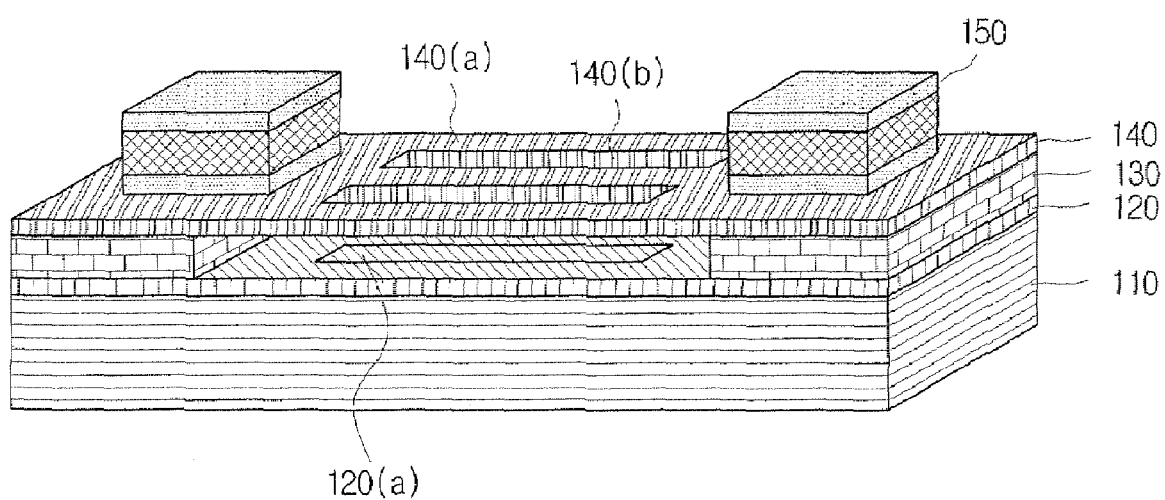
FIG. 1 is a partial perspective view showing a spatial optic modulator (SOM) in accordance with an embodiment of the present invention.

There can be a variety of permutations and embodiments of the present invention. The embodiments of the present invention are merely examples of embodying the present invention and are used to describe the technical ideas of the present invention. This, however, is by no means to restrict the present invention to certain embodiments.

The terms used in the description are intended to describe certain embodiments only, and shall by no means restrict the present invention. Unless clearly used otherwise, expressions in the singular number include a meaning in the plural number.

Hereinafter, some embodiments of the present invention will be described in detail with reference to the accompanying drawings. Identical or corresponding elements will be given the same reference numerals, regardless of the figure number, and any redundant description of the identical or corresponding elements will not be repeated. Also, throughout the description of the present invention, when describing a certain technology is determined to evade the point of the present invention, the pertinent detailed description will be omitted.

The optical modulator is mainly divided into a direct type, which directly controls the on/off state of light, and an indirect type, which uses reflection and diffraction. The indirect type can be further divided into an electrostatic type and a piezoelectric type.

An electrostatic type grating optical modulator, as disclosed in U.S. Pat. No. 5,311,360, includes a plurality of changeable reflective ribbons having reflective surfaces and suspended above an upper part of the substrate.

First, an insulation layer is deposited onto a silicon substrate, followed by depositions of a silicon dioxide film and a silicon nitride film. Here, the silicon nitride film is patterned with the ribbons, and some portions of the silicon dioxide film are etched such that the ribbons can be maintained by a nitride frame on an oxide spacer layer. The ribbon and the oxide spacer of the optical modulator are designed to have a thickness of $\lambda_0/4$ in order to modulate a light beam having a single wavelength $\lambda_0$.

The grating amplitude, of such a modulator limited to the vertical distance d between the reflective surfaces of the ribbons and the reflective surface of the substrate, is controlled by supplying a voltage between the ribbons (the reflective surface of the ribbon, which acts as a first electrode) and the substrate (the conductive film at the bottom portion of the substrate, which acts as a second electrode).

Figure 2:
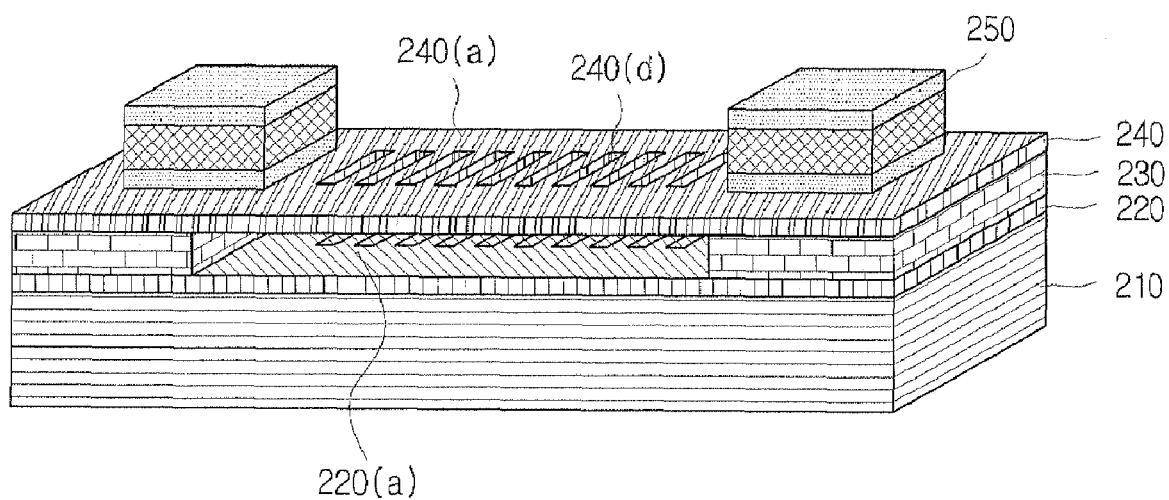
FIG. 2 is a partial perspective view showing a spatial optic modulator (SOM) in accordance with another embodiment of the present invention.

FIG. 1 is a partial perspective view showing a spatial optic modulator (SOM) in accordance with an embodiment of the present invention, and FIG. 2 is a partial perspective view showing a spatial optic modulator (SOM) in accordance with another embodiment of the present invention.

Referring to FIG. 1 and FIG. 2, the optical modulating device includes a substrate 110 or 210, an insulation layer 120 or 220, a sacrificial layer 130 or 230, a ribbon structure 140 or 240 and a piezoelectric element 150 or 250. The optical modulator can be configured to include m optical modulating devices, m being a natural number.

The substrate 110 or 210 is a commonly used semiconductor substrate, and the insulation layer 120 or 220 is deposited as an etch stop layer. The insulation layer 120 or 220 is formed from a material with a high selectivity to the etchant (an etching gas or an etching solution) that etches the material used as the sacrificial layer 130 or 230.

Here, a reflective layer 220(a) or 220(b) can be formed on the insulation layer 120 or 220 to reflect incident beams of light.

The sacrificial layer 130 or 230 supports the ribbon structure 140 or 240 at opposite sides such that the ribbon structure 140 or 240 can be spaced by a constant gap from the insulation layer 120 or 220 and be suspended, and forms a space in the center part.

The ribbon structure 140 or 240 makes upward and downward movements and creates diffraction and interference in the incident light to perform optical modulation of signals. In other words, an electrostatic signal, supplied to the piezoelectric element 150 or 250, leads the operation of the ribbon structure 140 or 240, and the incident light generates additional luminance corresponding to the operation of the ribbon. Here, as described above, the form of the ribbon structure 140 or 240 can have a plurality of ribbon shapes according to the electrostatic type, or can include a plurality of open holes in the center portion of the ribbons according to the piezoelectric type.

Also, the piezoelectric elements 150 and 250 control the ribbon structure 140 or 240 to move according to an upward or downward, or leftward or rightward, contraction or expansion operation generated by the difference in voltage between the ribbon and bottom electrodes.

The reflective layer 120(a) or 220(a) is formed in correspondence with the holes 140(b) or 240(b) formed in the ribbon structure 140 or 240.

For example, in case that the wavelength of a beam of light is λ, when there is no power supplied or when there is a predetermined amount of power supplied, the gap between an ribbon reflective layer 140(a) or 240(a), formed on the ribbon structure 140 or 240, and the insulation layer 120 or 220, formed with the reflective layer 120(a) or 220(a), is equal to nλ/2, n being a natural number.

Accordingly, in the case of a $0^{th}$-order diffracted (reflected) beam of light, the overall path length difference between the light reflected by the ribbon reflective layer 140(a) or 240(a) formed on the ribbon structure 140 or 240 and the light reflected by the reflective layer 120(a) or 220(a) on the insulation layer 120 or 220 is equal to nλ, so that constructive interference occurs and the diffracted light renders its maximum luminance. In the case of a $+1^{st}$ or $-1^{st}$ order diffracted light, however, the luminance of the light is at its minimum value due to destructive interference.

When a predetermined amount of power is supplied to the piezoelectric elements 150 or 250, other than the supplied power mentioned above, the gap between the ribbon reflective layer 140(a) or 240(a) formed on the ribbon structure 140 or 240 and the insulation layer 120 or 220, formed with the reflective layer 120(a) or 220(a), becomes (2n+1)λ/4, n being a natural number. Accordingly, in the case of a 0th-order diffracted (reflected) beam of light, the overall path length difference between the light reflected by the ribbon reflective layer 140(a) or 240(a) formed on the ribbon structure 140 or 240 and the light reflected by the reflective layer 120(a) or 220(a) of the insulation layer 120 or 220 is equal to (2n+1)λ/2, so that destructive interference occurs, and the diffracted light renders its minimum luminance.

In the case of the $+1^{st}$ or $-1^{st}$ order diffracted light, however, the luminance of the light is at its maximum value due to constructive interference. As a result of such interference, the optical modulator can load signals on the beams of light by adjusting the quantity of the reflected or diffracted light.

Although the foregoing describes the cases that the gap between the ribbon structure 140 or 240 and the insulation layer 120 or 220 formed with the lower reflective layer 120(a) or 220(a) is nλ/2 or (2n+1)λ/4, it is obvious that a variety of embodiments, which are able to operate with a gap adjusting the intensity of interference by diffraction and reflection of the incident light, can be applied to the present invention.

The below description will focus on an optical modulating device illustrated in FIG. 1 and described above.

Figure 3:
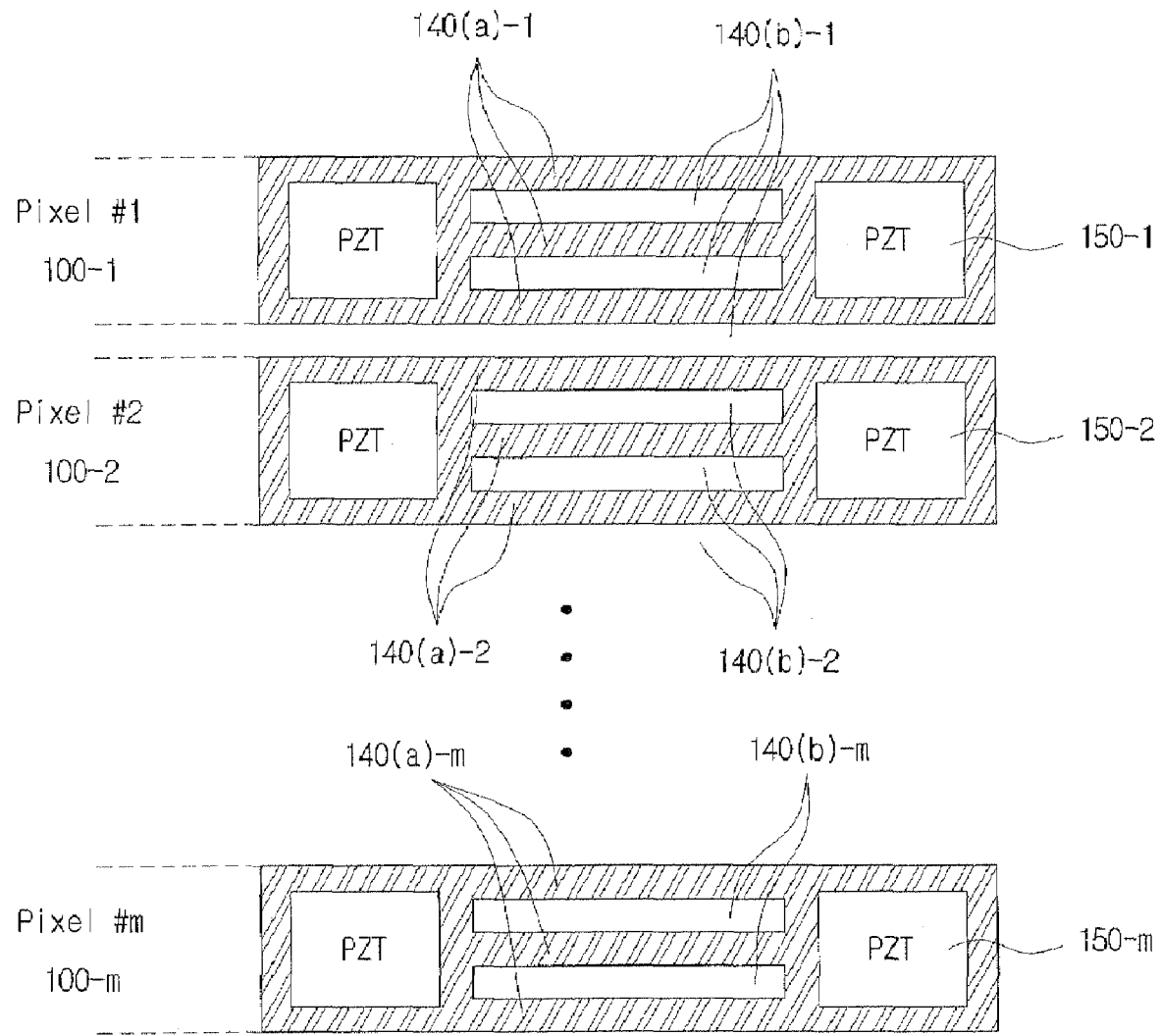
FIG. 3 is a plan view showing a spatial optic modulator (SOM) in accordance with an embodiment of the present invention.

FIG. 3 is a plan view showing a spatial optic modulator (SOM) in accordance with an embodiment of the present invention.

The SOM is an optical modulator that can adjust the quantity and luminance of an incident beam of light by supplying a predetermined amount of power to a piezoelectric element and changing a gap between a substrate and a ribbon.

Referring to FIG. 3, the optical modulator includes m micro-mirrors, m being a natural number. In detail, the optical modulator is configured to include m micro-mirrors 100-1, 100-2, . . . , and 100-m (hereinafter, referred to as 100), each of which corresponds to a first pixel (pixel #1), a second pixel (pixel #2), . . . , and an $m^{th}$ pixel (pixel #m), respectively. In the prevent invention, since one optical modulating device functions as the micro-mirror for reflecting a beam of light, the optical modulating device will be referred to as the micro-mirror.

In other words, the optical modulator deals with image information with respect to 1-dimensional images of vertical or horizontal scanning lines (which are assumed to consist of m pixels), while each micro-mirror 100 deals with one pixel among the m pixels constituting the vertical or horizontal scanning line.

Thus, the light reflected and diffracted by each micro-mirror is projected as a 2-dimensional image to a screen by an optical scanning device.

For example, in the case of projecting an image having a VGA resolution of 640*480, the operation, which 480 images reflected by 480 vertical pixels, respectively, are projected to the screen through an optical scanning device (not shown), is successively performed 640 times for one surface of the optical scanning device, to thereby generate 1 frame of display having a resolution of 640*480. Here, the optical scanning device can be a polygon mirror, a rotating bar, or a Galvano mirror, for example. It is assumed that the optical scanning device in accordance with an embodiment of the present invention has a form of hexagonal column and rotates.

While the following description of the principle of optical modulation will be based on the first pixel (pixel #1), the same can be obviously applied to other pixels.

In accordance with an embodiment of the present invention, the ribbon structure 140 is formed with 2 holes 140(b)-1 and with 3 ribbon reflective layers 140(a)-1, which are operated by the piezoelectric elements 150-1. The insulation layer 120 is formed with 2 reflective layers (not shown) corresponding to the two holes 140(b)-1. Also, another reflective layer is formed on the insulation layer 120 in correspondence with the gap between the first pixel (pixel #1) and the second pixel (pixel #2). Thus, for each pixel, the number of the ribbon reflective layers 140(a)-1 is 3, which is identical to that of reflective layers. In other words, as described above with reference to FIG. 1 and FIG. 2, it is possible to adjust the luminance of the modulated light using the $0^{th}$-order diffracted light or $±1^{st}$-order diffracted light.

Figure 4:
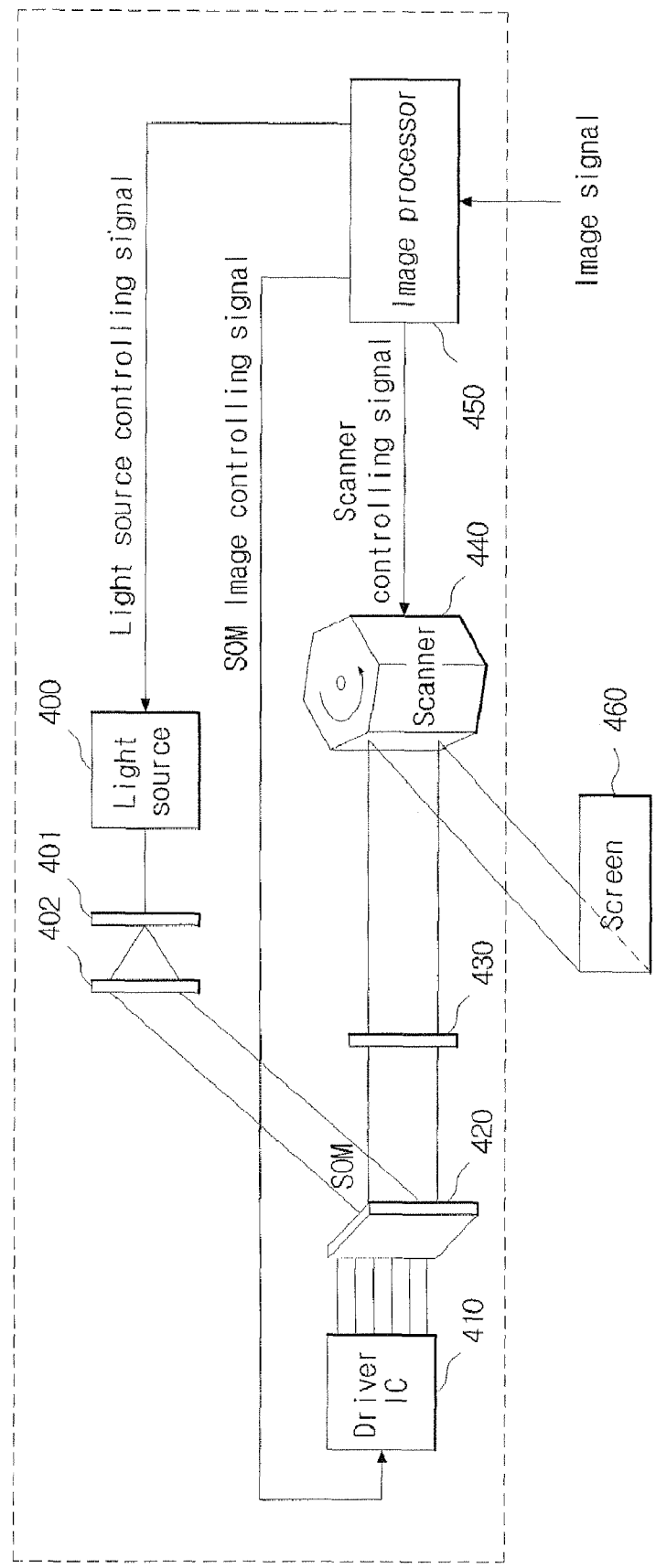
FIG. 4 is a conceptual diagram of a spatial optic modulating system in accordance with an embodiment of the present invention.

FIG. 4 is a conceptual diagram illustrating a spatial optic modulating system in accordance with an embodiment of the present invention.

Referring to FIG. 4, the spatial optic modulating system in accordance with an embodiment of the present invention is configured to include a light source 400, a plurality of light lens units 401 and 402, a driver IC 410, a spatial optic modulator (SOM) 420, an image lens unit 430, a scanner 440 and an image processor 450.

Here, FIG. 4 illustrates an optical modulating system projecting a 1-dimensional image by the SOM 420, arranged with a predetermined number of 1-dimensional shapes. Of course, as described above with reference to FIG. 3, a 2-dimensional image (e.g. an image having a resolution of 640*480) can be projected by the rotation movement of the scanner 440.

The light source 400 can emit a beam of light having a predetermined wavelength. The light emitted from the light source 400 is refracted at a regular angle and is concentrated to be transmitted to the SOM 420.

The light lens units 401 and 402 change the moving direction of the light emitted from the light source 400 and concentrate the light on the SOM 420, for transmittance.

The driver IC 410 receives image controlling signals transmitted from the image processor 450 and transfers the corresponding image controlling signal to each spatial optic modulating device constituting the SOM 420. The image controlling signal transferred in accordance with each spatial optic modulating device has different information. For example, the driver IC 410 can receive an image controlling signal transmitted from the image processor 450 and generate an operating signal for operating the SOM 420.

The SOM 420, which forms a diffraction image having a predetermined diffraction coefficient by diffracting linear light in a form of a transferred single image and then scans the linear light by using the scanner 440, is configured to include a plurality of spatial optic modulating devices having predetermined shapes of thin and thick film structures.

In accordance with an embodiment of the present invention, a temperature adjusting apparatus can be equipped to control the temperature of SOM 420.

In other words, the SOM 420 can control a level of diffraction of an optic modulating device according to an image controlling signal corresponding to each spatial optic modulating device. Through this, an image (e.g. an image having a resolution of 640*480) transferred from the light source can be projected to the scanner.

Of course, it shall be obvious that the SOM 420 can be configured in a form that is different from the form described with reference to FIG. 3. In other words, the SOM 420 can be configured differently according to its use. In accordance with an embodiment of the present invention, the SOM 420 can be configured to further include a micro-mirror (not shown) for maximizing the reflecting efficiency of an incident beam of light.

The image lens unit 430 transmits a diffraction image, which has a predetermined diffraction coefficient and is incident from the SOM 420, to the scanner 440. More specifically, the image lens unit 430 can be a projection lens. For example, in case that the diffracting images have $+1^{st}$ and $-1^{st}$ ordered diffraction coefficients, the image lens unit 430 can concentrate the two diffraction images together and transmit the images to the scanner 440.

As described above, there can be any speckle in a diffraction image projected through the image lens unit 430. This is caused by the interference phenomenon of diffraction images, as described above.

Accordingly, in accordance with an embodiment of the present invention, a phase modulating unit can be placed between the image lens unit 430 and the scanner 440. Here, the phase modulating unit can remove the speckle of light formed on a screen through the scanner by modulating and projecting a phase corresponding to the diffraction image having a $+1^{st}$ or $-1^{st}$ ordered diffraction coefficient. However, the phase modulating unit will be described in detail with reference to the pertinent drawings from FIG. 5.

The scanner 440 reflects an image, passed and transmitted through the image lens unit 430, to the screen 460. Of course, the optical scanning device, for example, the scanner 440, can be a polygon mirror, a rotating bar, or a Galvano mirror. Also, as described with reference to FIG. 3, in the case of receiving an image having a resolution of 640*480 from the light source, if the operation, in which the optical modulator including 480 spatial optic modulating devices projects 480 vertical pixels to the scanner at once, is performed 640 times for one surface of the optical scanning device, one frame of display having a resolution of 640*480 can be generated.

The image processor 450 can generate a light source controlling signal, firstly controlling the light source 400 corresponding to an image signal transmitted from the outside, an image controlling signal, controlling each operation of the spatial optic modulating device (or micro-mirror) constituting the SOM 420, and a scanner controlling rotation and operation of the scanner 440.

In accordance with an embodiment of the present invention, the light source controlling signal includes information related to an image to be projected by the light source 400 and controls the operation of the light source 400. For example, the light source controlling signal can include RGB information of each pixel of an image to be projected by the light source 400 and control an operation, corresponding to the RGB information, of the light source 400.

The image controlling signal includes information related to power, supplied to the piezoelectric element through the driver IC, for each micro-mirror constituting the SOM 420. Also, in order that the operation of each micro-mirror is performed separately for a beam of light incident from the light source, the image controlling signal to be transmitted substantially at the same time (i.e. within a predetermined period of time), can vary depending on each micro-mirror.

In addition, the scanner controlling signal controls the operation of the scanner in order that the scanner 440 can generate one frame of display during a regular period of time by using an image (or a beam of light) reflected from the aforementioned SOM. In an embodiment of the present invention, the scanner is assumed to be provided in a shape of a hexagonal column and be able to rotate at a regular cycle. For example, in the case of an image having a resolution of 480*640, the scanner controlling signal controls the scanner 440 to be operated corresponding to the light source controlling signal and the image controlling signal in order that 480 pixels can be reflected 640 times on one surface of the hexagonal column.

Of course, the image processor 450 can measure the operation efficiency of the scanner 440 and the SOM 420 and generate a control signal maintaining a corresponding control operation. In this case, it is obvious that the image processor 450 receive a signal corresponding to each operation.

FIG. 5 is a conceptual diagram illustrating a spatial optic modulating system removing a speckle by phase-modulating a half of the $0^{th}$ order diffraction image in accordance with an embodiment of the present invention.

As described above with reference to FIG. 4, a phase modulating unit 510 can be placed in between the SOM 420, the image lens unit 430 and the scanner 440. More particularly, the phase modulating unit 510 can be placed on a Fourier plane.

Here, the Fourier plane is a predetermined space plane where an image, transmitted from the SOM 420, passes through the image lens unit and is formed at a constant distance. In more detail, a diffraction image, passed through the image lens unit 430, is dispersed and converted into $0^{th}$, $+1^{st}$, $-1^{st}$, ... $_{+}n^{th}$ and $-n^{th}$ order diffraction images, but their foci can be formed on a predetermined area. At this time, the space plane formed with the focus of each diffraction image is the Fourier plane. Here, n is a natural number.

In this case, the $0^{th}$ order diffraction image can be formed on a center line based on the center of the image lens unit 430, and the $+1^{st}$ and $-1^{st}$ order diffraction images can be formed on an upper part and a lower part, respectively, based on the $0^{th}$ order diffraction image. In this order, $_{+}n^{th}$ and $-n^{th}$ order diffraction images can be also formed on the Fourier plane.

In other words, each diffraction image (e.g. $0^{th}$ order diffraction image) can be formed on an area (e.g. an area around the center line as described above) of the Fourier plane. The area can be distributed with a plurality of identical images in a form of a point. For example, an image (e.g. the image having 480 pixels as described above), transmitted from the SOM 420 at once, can pass through the image lens unit 430 and be infinitely formed in a form of a point on an area. Accordingly, the speckle can be reduced or removed by phase-modulating the area.

Since the $+1^{st\ and\ }-1^{st}$ order diffraction images or the $_{+}n^{th}$ and $-n^{th}$ order diffraction images are distributed separately on an upper part and a lower part based on its center axis, the diffraction image corresponding to one of the upper part and the lower part can be phase-modulated. However, since the $0^{th}$ order diffraction image is distributed on its center axis, some portions of the $0^{th}$ order diffraction image can be phase-modulated.

Here, the position located with the Fourier plane can be determined by the relationship with a diameter of the image lens unit 430. In other words, assuming that R is a radius of the image lens unit 430, the position F of the Fourier plane can be R/2.

One area of the Fourier plane can be concentrated with images reflected and transmitted by the SOM 420. However, each area of the Fourier plane, on which the $0^{th}$ order diffraction image, the $+1^{st}$ order diffraction image and $-1^{st}$ order diffraction image are concentrated, can be different from one another and be separately positioned.

As described above, the phase modulating unit 510 can phase-modulate the $0^{th}$ order diffraction image among diffraction images reflected from the SOM 420 and passing through the image lens unit 430. In this case, the area of the Fourier plane concentrated with the $0^{th}$ order diffraction image can be divided into a ½ portion and another ½ portion about the center axis of the image lens unit 430. The phase-modulator can be located at any one of the two portions (in the case of FIG. 5, the lower ½ portion). Of course, the phase-modulation can be performed for a ⅓ portion through a ⅔ portion instead of the ½ portion. In this case, the rate of reducing the speckle may be lowered.

Through this, the $0^{th}$ order diffraction image is divided into an image having a modulated phase and an image having an original phase, to be projected to a screen. This can cause the aforementioned speckle to be removed. This is because the speckles of an image having phases of a direction and an opposite direction offset each other.

FIG. 6 is a conceptual diagram illustrating a spatial optic modulating system removing a speckle by phase-modulating a half of the $+1^{st}$ and $-1^{st}$ order diffraction image in accordance with another embodiment of the present invention.

More particularly, in another embodiment of the present invention, a phase modulating unit 610 is located on an area of the Fourier plane that is projected with the $-1^{st}$ order diffraction image transferred from the SOM 420. Especially, since the $+1^{st}$ order diffraction image and the $-1^{st}$ order diffraction image, separated spatially from each other, had the same phases (e.g. zero degree) before phase modulation, the speckle is generated. However, after the phase modulation, the $+1^{st}$ order diffraction image and the $-1^{st}$ order diffraction image have opposite phases (e.g. 180 degree), and thus the speckle can be removed. This is because such a speckle caused by an image, reflected and formed by the screen 460 (referring to FIG. 4), being project as another image having an opposite phase is not visible to human eyes.

Although FIG. 5 and FIG. 6 illustrate the phase modulation of $0^{th}$ and $+1^{st}/-1^{st}$ order diffraction images, it shall be obvious that the technical ideas of the prevent invention can be applied to $+n^{th}/-n^{th}$ order diffraction images, n being a natural number.

FIG. 7 is a conceptual diagram illustrating a spatial optic modulating system removing a speckle by connecting a phase modulating unit to a scanner in accordance with another embodiment of the present invention.

FIG. 7 illustrates the case of a phase modulator 710 being connected to a Galvano mirror (or a scanner), unlike the phase modulator 510 or 610 located on the foregoing Fourier plane. In this case, the Galvano mirror can be placed on the Fourier plane.

In other words, the phase modulator, described with reference to FIG. 5 and FIG. 6, phase-modulates and transmits to the Galvano mirror (or scanner) light, reflected from the SOM 420 and passing through the image lens unit 430. However, the phase modulator of FIG. 7 can omit the aforementioned process of transmitting the phase-modulated light due to direct connection to the Galvano mirror.

Figure 8A:
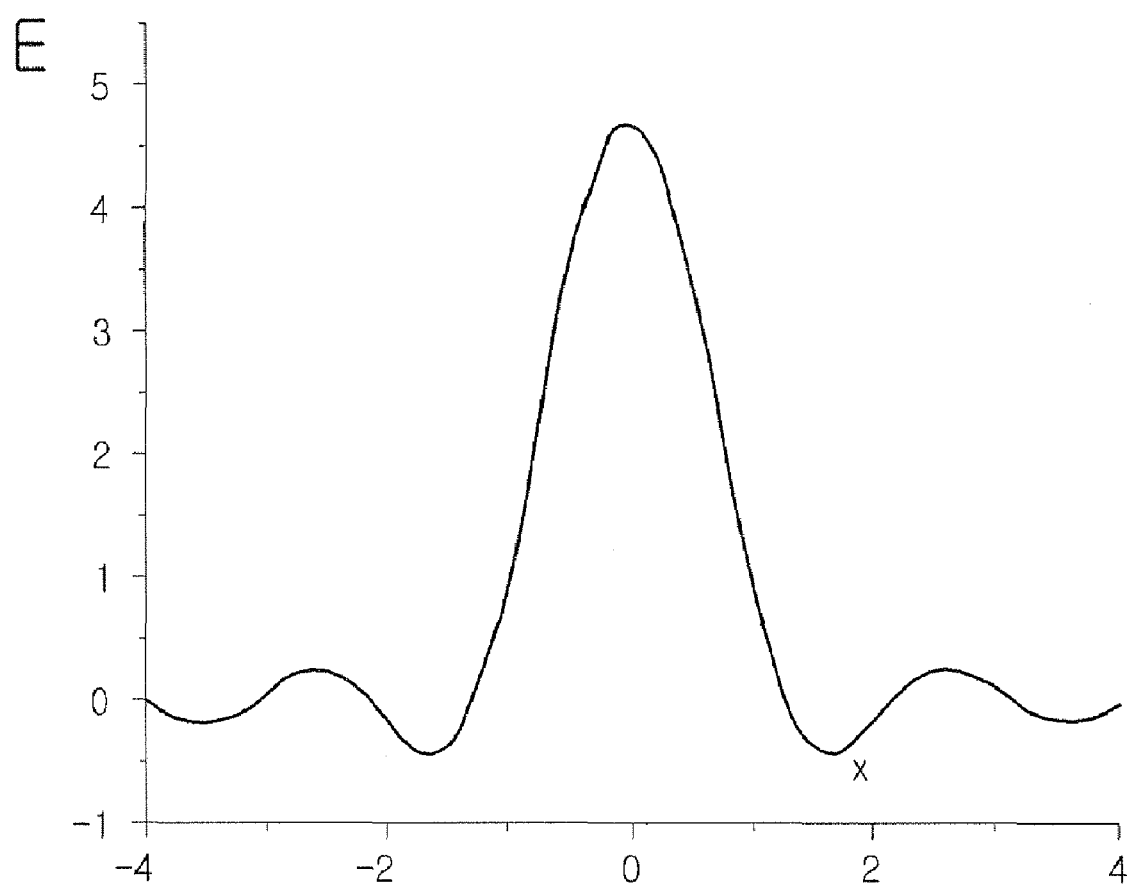
FIG. 8A illustrates an energy distribution graph of the $+1^{st}$ order diffraction image or $-1^{st}$ order diffraction image in accordance with an embodiment of the present invention.

FIG. 8A illustrates an energy distribution graph of the $+1^{st}$ order diffraction image or $-1^{st}$ order diffraction image in accordance with an embodiment of the present invention. Here, the corresponding superposition value can be increased more.

Figure 8B:
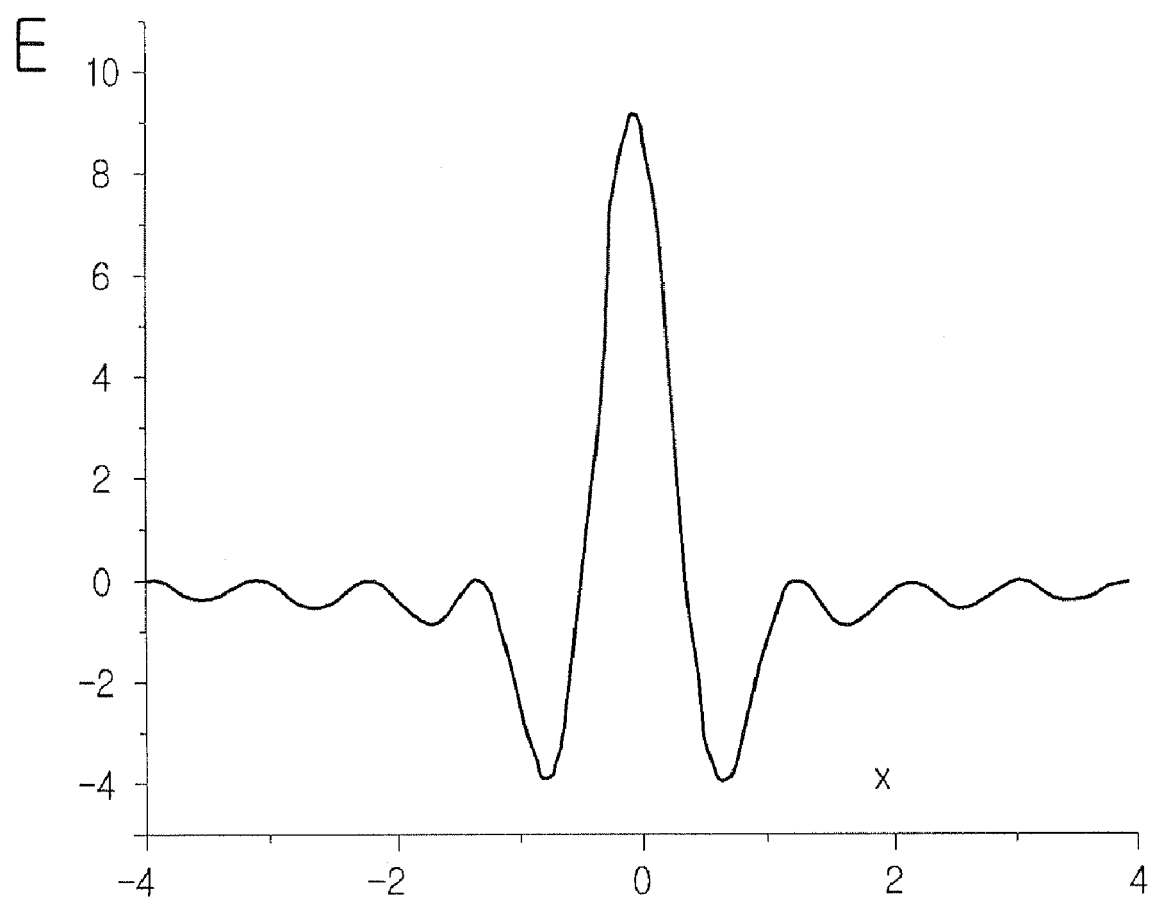
FIG. 8B illustrates an energy distribution graph when the $+1^{st}$ and $-1^{st}$ order diffraction images are overlapped in accordance with an embodiment of the present invention.

FIG. 8B illustrates an energy distribution graph in the case of the superposition of $+1^{st}$ and $-1^{st}$ order diffraction images in accordance with an embodiment of the present invention. In this case, since the $+1^{st}$ and $-1^{st}$ order diffraction images have the same phases (e.g. zero degree), the superposed energy distribution is twice as great as the energy distribution of FIG. 8A. This makes a user's eye recognize the speckle, and thus any one of the foregoing $+1^{st}$ and $-1^{st}$ order diffraction images is phase-modulated and superposed in order to reduce this speckle.

Figure 8C:
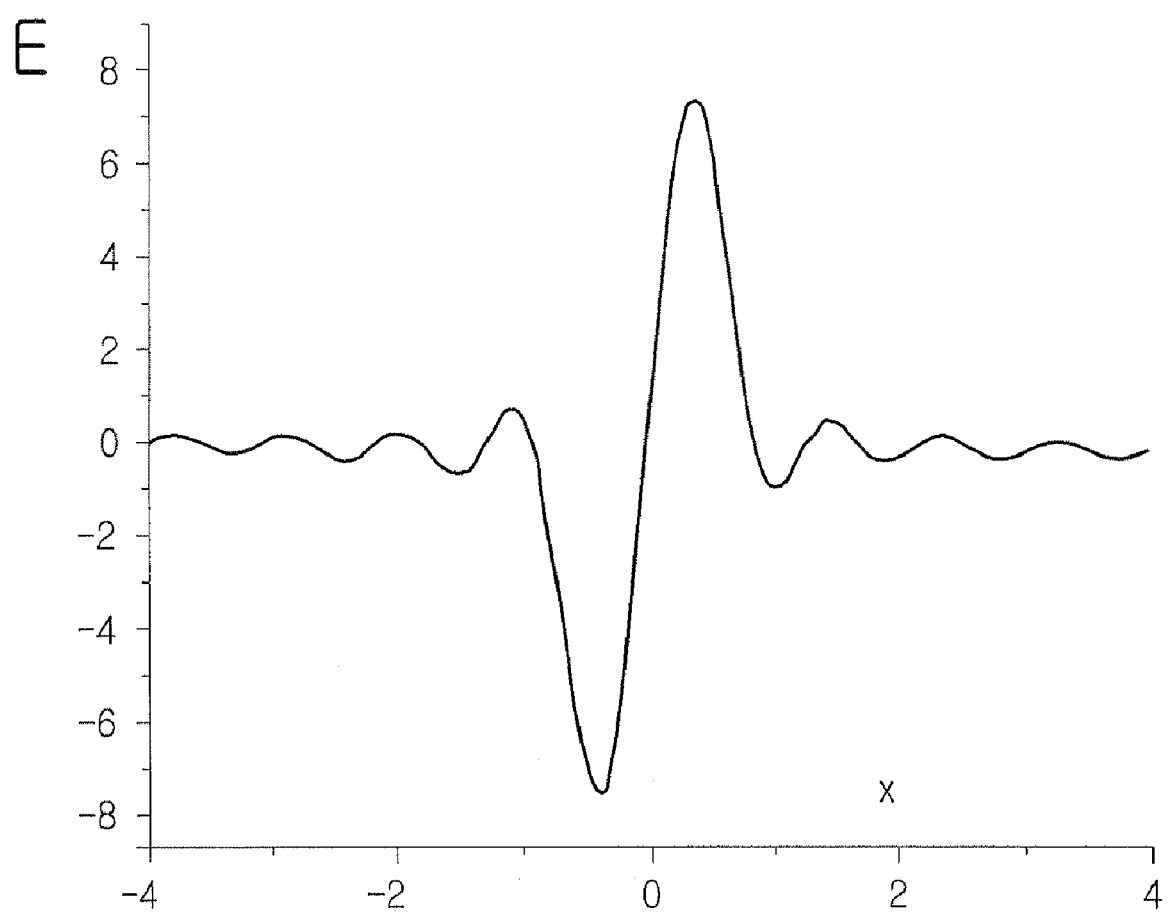
FIG. 8C illustrates an energy distribution graph when the $+1^{st}$ or $-1^{st}$ order diffraction images are overlapped after phase-modulation in accordance with an embodiment of the present invention.

FIG. 8C illustrates an energy distribution graph in the case of being overlapped after the phase-modulation of the $+1^{st}$ or $-1^{st}$ order diffraction image in accordance with an embodiment of the present invention In the case of phase-modulating the $-1^{st}$ order diffraction image, the graph of the $-1^{st}$ order diffraction image shows energy distribution that is contrary to the distribution of FIG. 8A. As the result of superposing the $-1^{st}$ and $+1^{st}$ order diffraction images, the distribution is decreased as illustrated in FIG. 8C. In other words, the user sees the image, from which the speckle is removed.

FIG. 8D illustrates absolute square per time of the energy distribution graph of FIG. 8C.

Although some embodiment of the present invention have been described, anyone of ordinary skill in the art to which the invention pertains should be able to understand that a very large number of permutations are possible without departing the spirit and scope of the present invention and its equivalents, which shall only be defined by the claims appended below.

What is claimed is:

1. A spatial optic modulating system with speckle reduction, comprising:
a spatial optic modulator, modulating and reflecting an image transferred in accordance with an upward or downward movement of a ribbon which is operated according to a contraction or expansion of a piezoelectric element;
an image lens unit, transferring the image modulated from the spatial optic modulator as a diffraction image to a scanner; and
a phase modulator, modulating a phase of the diffraction image transferred from the image lens unit.

2. The system of claim 1, further comprising:
an image processor, generating a light source controlling signal for controlling the operation of a light source in accordance with a predetermined image signal, an image control signal for controlling the operation of a micro-mirror that is included in the spatial optic modulator and modulates and reflects light, emitted from the light source, in accordance with a pixel, and a scanner controlling signal for controlling the operation of a scanner reflecting an image to a screen;
a light lens unit, reflecting and concentrating the light emitted from the light source and transferring the reflected light;

a driver IC, receiving the image controlling signal transferred from the image processor and generating an operating signal for operating the spatial optic modulator; and a scanner, reflecting the image transferred from the spatial optic modulator to the screen.

3. The system of claim 2, wherein the phase modulator is coupled to the scanner.

4. The system of claim 1, wherein the phase modulator is located on a Fourier plane.

5. The system of claim 4, wherein the Fourier plane is formed at a constant distance from the image lens unit, whereas the constant distance is ½ of a radius of an image lens of the image lens unit.

6. The system of claim 4, wherein the diffraction image is a $0^{th}$ order diffraction image, and the phase modulator phase-modulates light distributed on an area of a section of the $0^{th}$ order diffraction image passing through the Fourier plane.

7. The system of claim 6, wherein the area ranges between a ⅓ portion and a ⅔ portion of the section.

8. The system of claim 4, wherein the diffraction image is a $+n^{th}$ or $-n^{th}$ order diffraction image, n being a natural number, and the phase modulator modulates a phase of the $+n^{th}$ or $-n^{th}$ order diffraction image.

9. The system of claim 8, wherein the n is 1.

* * * * *